United States Patent
Lebzelter et al.

(10) Patent No.: US 8,920,995 B2
(45) Date of Patent: Dec. 30, 2014

(54) SYSTEMS AND METHODS FOR PREDICTING POLARIZATION CURVES IN A FUEL CELL SYSTEM

(71) Applicant: GM Global Technology Operations LLC, Detroit, MI (US)

(72) Inventors: Derek R. Lebzelter, Fairport, NY (US); Sriram Ganapathy, Honeoye Falls, NY (US); Daniel T. Folmsbee, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 13/839,261

(22) Filed: Mar. 15, 2013

(65) Prior Publication Data

US 2014/0272652 A1 Sep. 18, 2014

(51) Int. Cl.
H01M 8/04 (2006.01)
(52) U.S. Cl.
CPC .................................. H01M 8/04992 (2013.01)
USPC ............................ 429/431; 429/428; 429/432
(58) Field of Classification Search
None
See application file for complete search history.

(56) References Cited

U.S. PATENT DOCUMENTS

| | | | |
|---|---|---|---|
| 5,879,828 A | 3/1999 | Debe et al. | |
| 6,020,584 A | 2/2000 | Brarens et al. | |
| 6,271,522 B1 | 8/2001 | Lindermeir et al. | |
| 6,624,636 B2 | 9/2003 | Arai et al. | |
| 6,756,141 B2 | 6/2004 | Miller et al. | |
| 6,777,122 B2 | 8/2004 | Okamoto | |
| 6,794,844 B2 | 9/2004 | Hochgraf et al. | |
| 6,847,188 B2 | 1/2005 | Keskula et al. | |
| 7,124,040 B2 | 10/2006 | Engelhardt et al. | |
| 7,348,082 B2 | 3/2008 | Kolodziej | |
| 7,569,293 B1 | 8/2009 | Cross, III | |
| 7,632,583 B2 | 12/2009 | Pearson | |
| 8,192,879 B2 | 6/2012 | Salvador et al. | |
| 8,214,174 B2 | 7/2012 | Ganapathy et al. | |
| 2006/0166051 A1 | 7/2006 | Murthy et al. | |
| 2006/0194082 A1 | 8/2006 | Tucker et al. | |
| 2006/0263653 A1* | 11/2006 | Sinha et al. ..................... | 429/13 |
| 2008/0076012 A1* | 3/2008 | Lienkamp et al. .............. | 429/65 |

(Continued)

FOREIGN PATENT DOCUMENTS

| | | |
|---|---|---|
| CN | 1635357 | 7/2005 |
| JP | 2003346849 | 12/2003 |

(Continued)

OTHER PUBLICATIONS

Hu Weihua, et al., "Study on Electric Pressure Models of Proton Exchanging Film Fuel Cells", Automobile Technology, 2002 (10).

(Continued)

*Primary Examiner* — Gregg Cantelmo
(74) *Attorney, Agent, or Firm* — Phillips Ryther & Winchester; Jared L. Cherry (57) ABSTRACT

The present disclosure relates to systems and methods that may be used to predict a performance metric of a fuel cell. A system consistent with the present disclosure may include sensors in communication with the fuel cell stack, a performance metric prediction system, and a control system. The performance metric prediction system may determine a current density based on inputs provided by the sensors at a plurality of time periods, calculate a first parameter while the current density is below a lower threshold, and calculate a second parameter while the current density is above an upper threshold. The first parameter and the second parameter may be used to selectively adjust a fuel cell polarization curve over time. Based upon the polarization curve, a performance metric of the fuel cell stack may be predicted. The control system may implement a control action based upon the performance metric.

20 Claims, 5 Drawing Sheets

(56) References Cited

U.S. PATENT DOCUMENTS

2008/0182139 A1* 7/2008 Ganapathy et al. ............. 429/13
2011/0223505 A1* 9/2011 Ganapathy et al. ............ 429/431
2011/0239747 A1* 10/2011 Zhang et al. ................. 73/64.44

FOREIGN PATENT DOCUMENTS

JP 2005166601 6/2005
JP 2005322577 11/2005
JP 2006244966 9/2006

OTHER PUBLICATIONS http://comp.uark.edu/~jjrencis/femur/Learning-Modules/Linear-Algebra/mtxdef/transpose/transpose.html; Transpose of a matrix; Oct. 24, 2011; 2 pages.

http://programmedlessons.org/VewctorLessons/vmch13/vmch13_14.html; Transpose; Oct. 24, 2011, 2 pages.

* cited by examiner

SYSTEMS AND METHODS FOR PREDICTING POLARIZATION CURVES IN A FUEL CELL SYSTEM

TECHNICAL FIELD

This disclosure relates to systems and methods for predicting fuel cell stack performance. More specifically, but not exclusively, this disclosure relates to systems and methods for determining one or more performance metrics that may be used to adjust parameters for increased efficiency and performance optimization of a fuel cell stack.

BACKGROUND

Passenger vehicles may include fuel cell ("FC") systems to power certain features of a vehicle's electrical and drivetrain systems. For example, an FC system may be utilized in a vehicle to power electric drivetrain components of the vehicle directly (e.g., electric drive motors and the like) and/or via an intermediate battery system. An FC system may include a single cell or, alternatively, may include multiple cells arranged in a stack configuration.

Hydrogen is one possible fuel that may be used in a FC system. Hydrogen is a clean fuel and may be used to efficiently produce electricity in a fuel cell. A hydrogen fuel cell is an electrochemical device that includes an electrolyte disposed between an anode and a cathode. The anode receives hydrogen gas and the cathode receives oxygen or air. The hydrogen gas is dissociated in the anode to generate free hydrogen protons and electrons. The hydrogen protons may be selectively conducted across the electrolyte. The electrons from the anode cannot pass through the electrolyte, and thus are directed through a load to perform work before being sent to the cathode. The hydrogen protons react with the oxygen and the electrons in the cathode to generate water.

Proton exchange membrane fuel cells ("PEMFC") may be used in FC vehicles. A PEMFC generally includes a solid polymer electrolyte proton conducting membrane, such as a perfluorosulfonic acid membrane. An anode and cathode included in a PEMFC may include finely divided catalytic particles, such as platinum (Pt), supported on carbon particles and mixed with an ionomer. A catalytic mixture may be deposited on opposing sides of the membrane.

The open circuit voltage of a typical FC stack may decrease over the lifetime of the FC stack. Voltage degradation may be attributable, among other things, to voltage cycling of the FCs in the stack. Voltage cycling occurs when the platinum catalyst particles used to enhance the electro-chemical reaction transition between a low and high potential state. The repeated transition of the catalyst particles promotes dissolution of the particles. Dissolution of the particles results in loss of active surface area of the particles and performance degradation.

Many factors may influence the relative loss in surface area of the platinum particles relating to voltage cycling, including peak stack voltage, temperature, stack humidification, voltage cycling dynamics, etc. Lower stack voltage set-points may offer greater protection against degradation, but higher stack voltage set-points may provide increased system efficiency.

A fixed voltage may be used to set a stack minimum power level to prevent unwanted voltage cycling. For example, a typical voltage suppression strategy may use a fixed voltage set-point. If a fuel cell power controller is not requesting power, or is requesting minimal power, the power generated by the stack necessary to maintain cell voltage levels at or below the fixed voltage set-point may be provided to certain systems or components where the power is used or dissipated. For example, excess power may be used to charge a high-voltage battery in a FC system vehicle. If the voltage set-point is at a relatively low voltage, then the system may charge the battery frequently, which may result in the battery charge to be at its maximum charge more frequently than it would be if the voltage set-point is set at a lower level. If the battery is at its maximum charge and cannot accept more charging power from the FC system, then the controller may cause the excess power to be dissipated in other components, such as resistors. Where excess power is dissipated using resistors, system efficiency may suffer. Accordingly, establishing an optimal set-point may improve the efficiency of an FC stack.

Several FCs may be combined in an FC stack to produce a desired power out. The FC stack may receive a cathode input gas that may comprise a flow of air forced through the stack by a compressor. Cathode exhaust gas may include water as a stack by-product, together with unconsumed oxygen and other gases.

The current/voltage relationship of the stack may be referred to as a polarization curve. A stack controller may utilize information about the polarization curve to schedule delivery of reactants to the FC system in accordance with power demands. The relationship between the voltage and the current of the stack may be non-linear, and may be influenced by many variables, including stack temperature, stack partial pressures, and cathode and anode stoichiometries. Additionally, the relationship between the FC stack current and voltage may change over time as the stack performance degrades. In other words, an older FC stack may have lower cell voltages, and accordingly, an older FC stack may need to provide more current than a new, non-degraded stack to produce an equivalent power output.

SUMMARY

Disclosed herein are a variety of systems and methods for determining one or more performance metrics of an FC system. According to various embodiments, the performance metrics may be used to adjust parameters of the FC system for increased efficiency and performance optimization. A performance metric prediction system may receive a plurality of inputs from a plurality of sensors. The inputs may comprise information relating to a plurality of operating conditions associated with the FC system. A variety of types of information may be measured, calculated, or estimated, based upon the inputs, according to various embodiments. The inputs may be utilized in order to calculate certain parameters. According to one embodiment consistent with the present disclosure, one parameter may be determined when the system is at high current density and another may be determined when the system is at low current density.

An FC control system may utilize one or more performance metrics to implement control actions associated with an FC system. According to some embodiments, the performance metrics may be utilized to optimize performance characteristics of the FC system. According to some embodiments the performance metrics may comprise parameters associated with a polarization curve. The performance metrics may be adjusted over time to achieve increased performance of the FC system.

According to some embodiments, a performance metric prediction system may be configured to selectively discard current density measurements during time periods in which a temperature measurement is below a specified threshold. In certain embodiments, a coolant temperature may be measured, since the coolant temperature may be indicative of an FC stack temperature. Certain FC systems consistent with the present disclosure may have repeatable operating conditions at a given current density, once the FC stack is operating above a certain temperature. In those instances, the voltage can be approximately described as a function of age and the stack current density expressed in terms of the adjustable parameters. Data values gathered when an FC stack operating temperature may, according to some embodiments, be discarded, since performance estimates based upon such data may be suboptimal.

Certain embodiments may include a fault detection system, in conjunction with a plurality of electrical sensors. The fault detection system may be configured to detect a fault condition based upon input from one or more of the plurality of electrical sensors. The fault detection system may be used to detect faults associated with sensors that measure, for example, current density, coolant temperature, platinum oxide coverage, voltage, or any other parameter that may be relevant to the methods described in the present disclosure.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein may be utilized to determine one or more parameters of an FC system, including a maximum current output, parameters relating to scheduling of current requests, parameters relating to operation of a voltage suppression, etc. In certain embodiments, the systems and methods may utilize a polarization curve predictor. The polarization curve predictor may utilize measured and/or predicted inputs to optimize adjustable parameters. The inputs may be based on measurements and/or calculations associated with the FC system. The inputs may be collected at upper and lower thresholds of the current density, and may be used to selectively adjust the FC polarization curve over time.

Figure 1A:
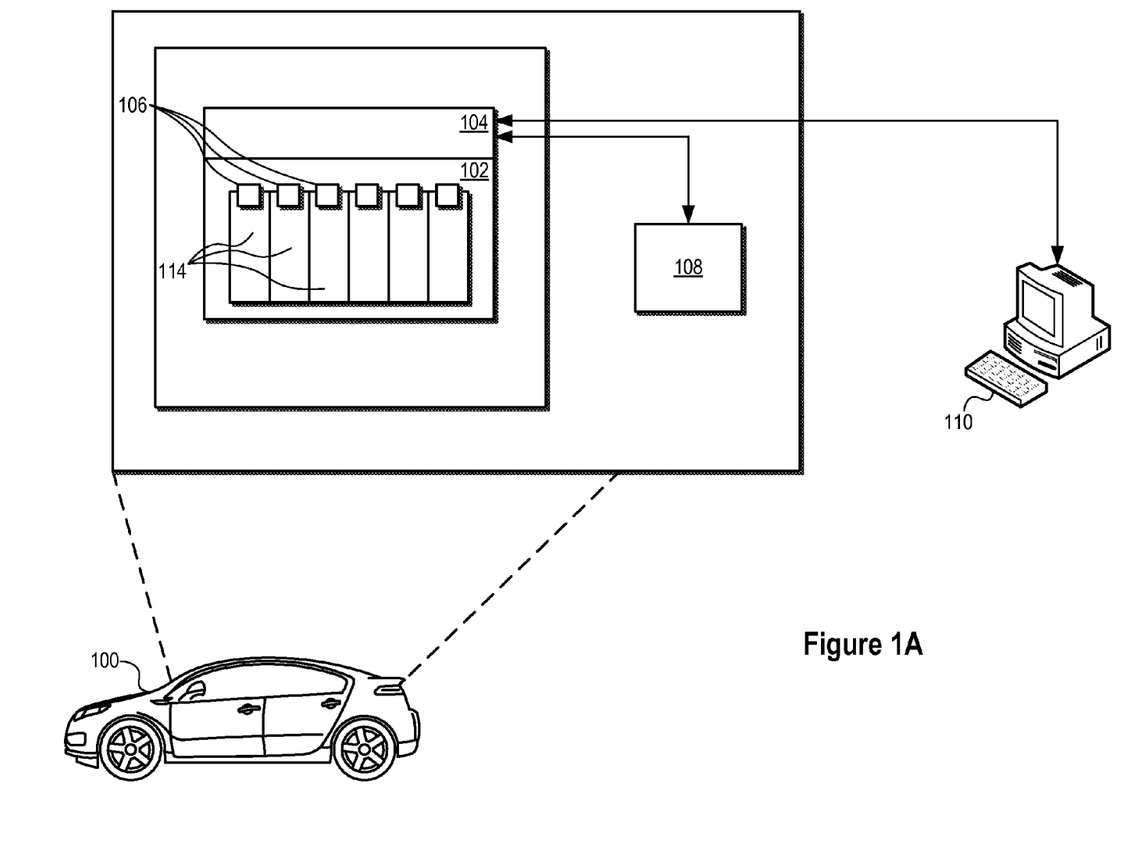
FIG. 1A illustrates a functional block diagram of an exemplary vehicle system consistent with embodiments disclosed herein.

FIG. 1A illustrates a functional block diagram of an exemplary vehicle system 100 consistent with embodiments disclosed herein. The vehicle system 100 may be a motor vehicle, a marine vehicle, an aircraft, and/or any other type of vehicle. Moreover, embodiments consistent with the present disclosure may be incorporated into a fuel cell system adapted for use outside of vehicle applications, as would be apparent to of skill in the art. The vehicle 100 may include an FC stack 102 that, in certain embodiments, may be coupled with a high-voltage ("HV") battery system (not shown). The HV battery system may be used to power electric drivetrain components. In further embodiments, the FC stack 102 may be coupled with a low voltage battery and may be configured to supply electric energy to a variety of vehicle 100 systems including, for example, vehicle starter systems (e.g., a starter motor), lighting systems, ignition systems, climate control systems, and the like.

The FC stack 102 may include an FC control system 104. The FC control system 104 may be configured to monitor and control certain operations of the FC stack 102. For example, the FC control system 104 may be configured to monitor and control adjustable performance parameters and voltage suppression operations of the FC stack 102. In certain embodiments, the FC control system 104 may be communicatively coupled with plurality of sensors 106 (e.g., voltage sensors, current sensors, and/or the like, etc.) and/or other systems configured to enable the FC control system 104 to monitor and control operations of the FC stack 102. For example, the plurality of sensors 106 in communication with the FC stack 102 may provide FC control system 104 with information that may be used to estimate a polarization curve. In certain embodiments the FC control system 104 may be configured to monitor each cell 114 individually. The FC control system 104 may further be configured to provide information to and/or receive information from other systems included in the vehicle 100. For example, the FC control system 104 may be communicatively coupled with an internal vehicle computer system 108 and/or an external computer system 110 (e.g., via a wireless telecommunications system or the like). In certain embodiments, the FC control system 104 may be configured, at least in part, to provide information regarding the FC stack 102 to a user of the vehicle 100, vehicle computer system 108, and/or external computer system 110. Such information may include, for example, maximum power output at specific operating conditions, coolant temperature, sensor faults, and/or any other information regarding the FC stack 102.

Figure 1B:
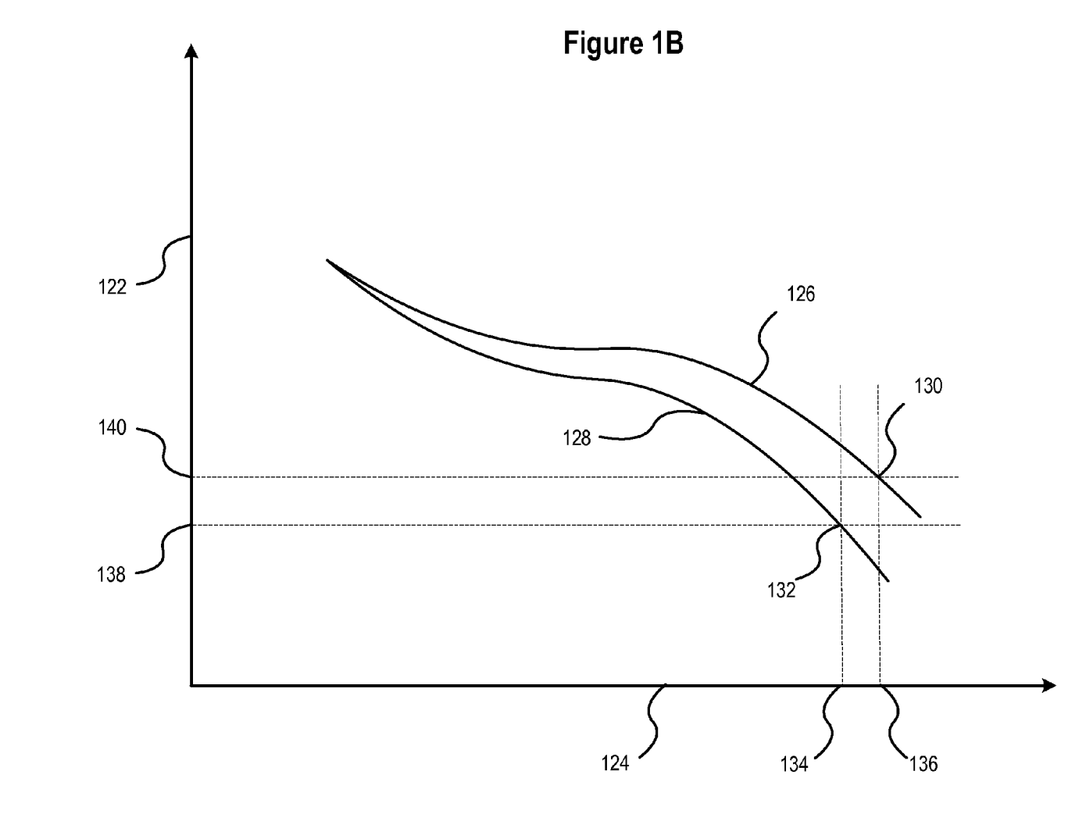
FIG. 1B illustrates an example of an FC polarization curve consistent with embodiments disclosed herein.

FIG. 1B illustrates a graph showing two exemplary polarization curves. The horizontal axis 124 shows FC stack current density, and the vertical axis 122 shows FC stack voltage. Each fuel cell within an FC stack may exhibit a different polarization curve. Polarization curve 128 may represent the polarization curve of the fuel cell having a low cell voltage (e.g., the lowest cell voltage), while polarization curve 126 may represent the polarization curve of an average fuel cell. A maximum power output may be determined for each cell. Point 130 represents the maximum power available from the average cell in the FC stack, while point 132 represents the maximum power available from the cell having the low cell voltage. The current corresponding to point 132 is represented at 134, and the voltage is represented at 138. Similarly, the current corresponding to point 130 is represented at 136 and the voltage is represented at 140.

Polarization curves 126, 128 may be mathematically described based upon a number of parameters. The parameters may be determined using a variety of methods, calculations, and techniques described herein. As a result of changes in the parameters, the slope, concavity, points of inflection, and other features of polarization curves 126, 128 may be adjusted. Such adjustments may improve estimates of a physical system that is modeled by polarization curves 126, 128.

Figure 2:
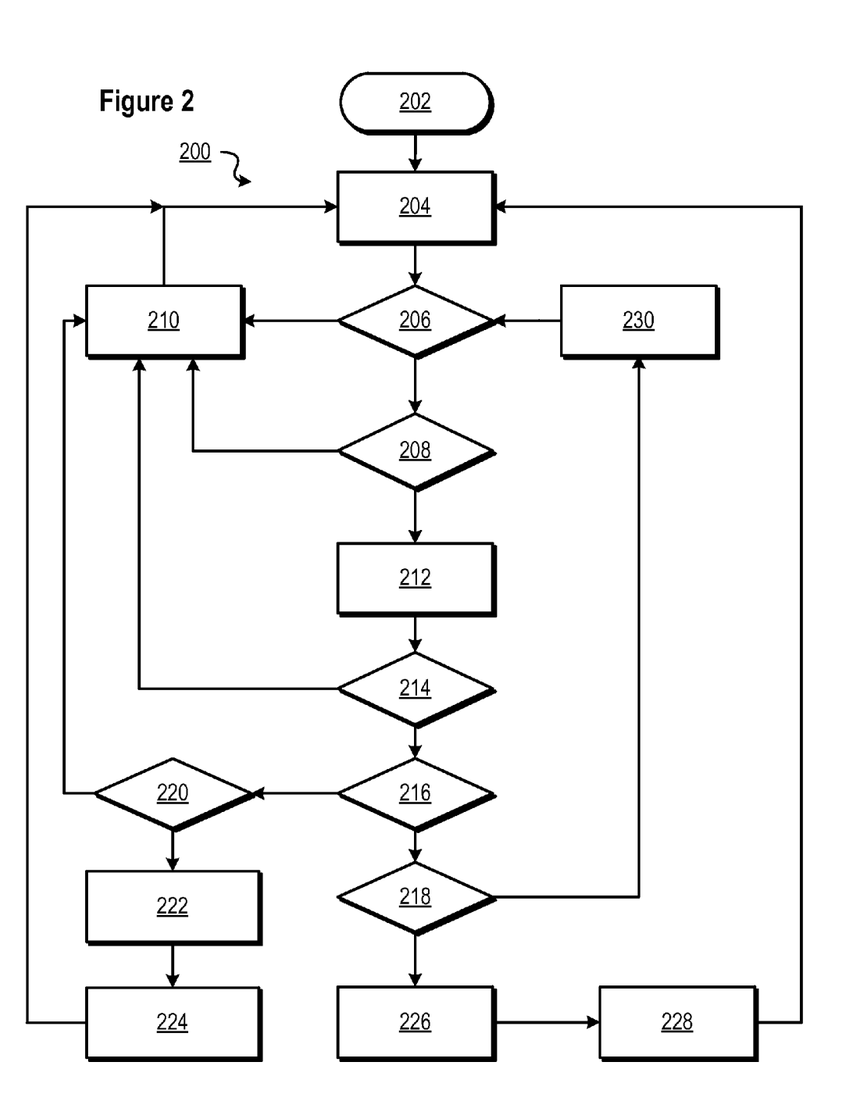
FIG. 2 illustrates a flow chart of an exemplary method to predict performance metrics of an FC system consistent with embodiments disclosed herein.

FIG. 2 illustrates a flow chart of an exemplary method for predicting performance metrics of an FC system consistent with embodiments disclosed herein. The illustrated method 200 may be performed using, at least in part, a vehicle computer system, an external computer system, an FC control system, an analog and/or digital filter system, and/or any other suitable system including the systems described in reference to FIG. 1A, FIG. 3, and FIG. 4.

Method 200 may begin at 202. At 204, one or more performance metrics associated with an FC stack may be predicted. An initial prediction may be based upon historical data. Relevant sensors may be validated at 206, and if any sensors are associated with a fault, method 200 may result in no adaptation of parameters at 210. If no sensors are associated with a fault, the FC system may measure a coolant temperature to determine if it is above the appropriate threshold at 208. If the coolant temperature is not above the specified threshold, parameters may not be adapted at 210, because certain predictions may be more accurate when they are based upon data associated with temperature measurements above a threshold. If the temperature measurements are above the threshold, the FC system may determine a current density at 212 based on at least one of the plurality of inputs at a plurality of time periods.

At 214, a current density may be compared to a low threshold and compared to a high threshold. If the current density is found to be above the low threshold and below a specified high threshold at 214, parameters may not be adapted at 210. In other words, if the current density is between the low threshold and the high threshold, the measurement may be discarded.

If a current density is below the low threshold at 216, method 200 may progress to 220. At 220, method 200 may determine whether platinum oxidation coverage exceeds a particular threshold. Platinum oxide coverage may be used in certain embodiments because a high value may indicate a steady state operation at low current densities. If platinum oxide coverage is above a specified high threshold at 220, a mass activity parameter may be calculated at 222. According to some embodiments, the mass activity parameter may be determined using Eq. 1.

$$\eta_{ORR} = E_{rev} - \eta_{HOR} - V_{cell} - i \cdot \left(\frac{R_{HFR} + R_{PT} + R_{MT}^{SS}}{1000}\right) + V_{transient} \quad \text{Eq. 1}$$

where,
$E_{rev}$ is the thermodynamic reversible potential at reference conditions;

$\eta_{HOR}$ is the hydrogen oxidation reduction overpotential;
$V_{cell}$ is the average cell voltage feedback;
i is the stack current density;
$R_{HFR}$ is the stack HFR average;
$R_{PT}$ is the protonic resistance in electrode;
$R_{MT}^{SS}$ is the mass transfer coefficient; and
$V_{transient}$ is the transient correction voltage factor.

Based upon the determinations made at 214 and 216, calculation of the mass activity parameter occurs during a first time period in which the current density is below a threshold. The mass activity parameter may be used to adapt a predictive mass activity with the calculated mass activity at 224.

If the current density is above the high threshold at 216, method 200 may progress to 218. At 218, method 200 may determine whether platinum oxidation coverage exceeds a particular threshold. If the platinum oxide coverage is found to be above a specified threshold at 218, parameters may not be adapted at 230. If the platinum oxide coverage is below the threshold, method 200 may progress to 226, where a mass transfer coefficient may be calculated based on cell voltage and operating conditions. Since at high current the steady state voltage is measured at a low platinum oxide concentration, the estimated platinum oxide concentration must be low for adaptation to occur. According to some embodiments, the mass transfer coefficient may be determined using Eq. 2.

$$R_{MT}^{Raw} = \left(E_{rev} - V_{cell} - \eta_{HOR} - \eta_{ORR}^{filtd} + V_{transient}\right) \cdot \frac{1000}{i} - (R_{HFR} + R_{PT}) \quad \text{Eq. 2}$$

where,
$E_{rev}$ is the thermodynamic reversible potential at reference conditions;
$V_{cell}$ is the average cell voltage feedback;
$\eta_{OOR}^{filtd}$ is the hydrogen oxidation reduction overpotential;
$\eta_{HOR}$ is the cathode oxidation reduction overpotential;
i is the stack current density;
$R_{HFR}$ is the stack HFR average;
$R_{PT}$ is the protonic resistance in electrode;
$R_{MT}^{Raw}$ is the mass transfer coefficient; and
$V_{transient}$ is the transient correction voltage factor.

The system may then adapt the predictive mass transfer coefficient with the calculated mass transfer coefficient at 228. Based upon the determinations made at 214 and 216, the value calculated at 226 may be based upon measurements obtained during a time period in which the current density is above an upper threshold.

Returning to 204, a performance metric may be predicted, which may be used to adapt control parameters and improve system performance. System performance may be improved, according to various embodiments, by selectively implementing one or more control actions based upon the performance metric. For example, a control action may include scheduling a power request, scheduling delivery of reactants to an FC stack, adjusting a set-point of a voltage suppression system, etc.

Figure 3:
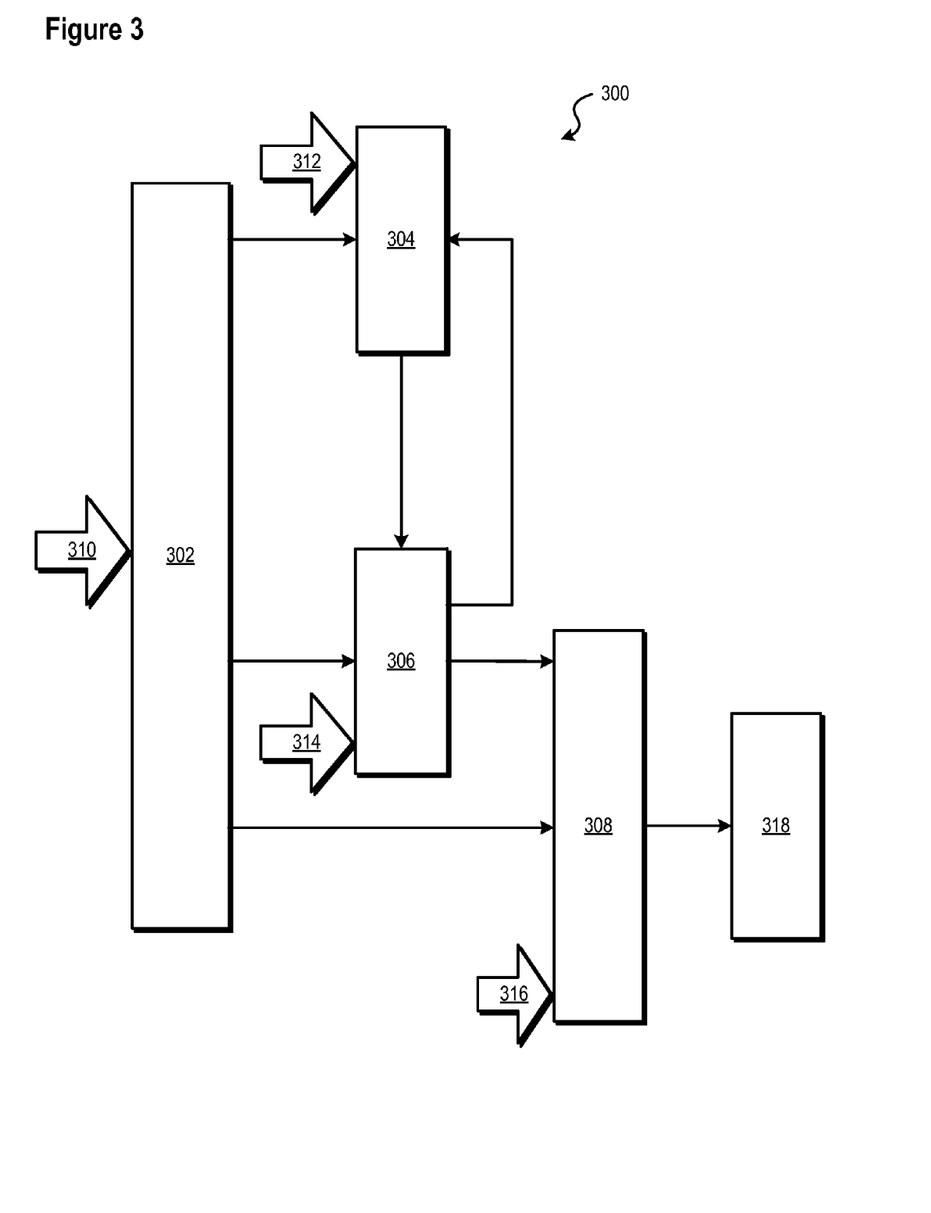
FIG. 3 illustrates a block diagram of a system for determining one or more parameters of an FC system consistent with embodiments disclosed herein.

FIG. 3 illustrates a block diagram of a system for determining one or more parameters of an FC system consistent with embodiments disclosed herein. System 300 may include a stack voltage and current characteristics module 302, a mass activity parameter estimation module 304, a mass transfer coefficient estimation module 306, an FC voltage estimation module 308, and an output 318. Stack voltage and current characteristics module 302 may receive a plurality of inputs 310. Inputs 310 may include coolant inlet temperature, coolant outlet temperature, cathode inlet pressure, cathode outlet pressure, and any other signal from a plurality of sensors that may provide an indication of stack voltage and current characteristics.

Stack voltage and current characteristics module 302 may generate a plurality of outputs that serve as inputs to mass activity parameter estimation module 304, mass transfer coefficient estimation module 306, and FC voltage estimation module 308. Outputs from stack voltage and current characteristics module 302 may include, among other things, calculations of instantaneous partial pressures, an equilibrium voltage, an exchange current density for hydrogen oxidation and equivalent catalytic heating due to hydrogen addition on the cathode, current density, and a variety of other parameters.

Mass activity parameter estimation module 304 may receive inputs from stack voltage and current characteristics module 302 and from other sources. Inputs 312 may represent inputs from sources other than stack voltage and current characteristics module 302. According to various embodiments, inputs 312 may include sensor inputs, constant values, values calculated by other modules not illustrated in FIG. 3, and the like. In some embodiments, inputs 312 may comprise all of inputs 310 and/or a subset of inputs 310. Inputs 312 may include, but are not limited to current density thresholds, temperature thresholds, and any other parameter or constant that may be used by mass activity parameter estimation module 304.

Using inputs 312, an input from mass transfer coefficient estimation module 306, and certain outputs from stack voltage and current characteristics module 302, mass activity parameter estimation module 304 may generate an estimation of a mass activity parameter. According to various embodiments consistent with the present disclosure, the mass activity parameter may be calculated using Eq. 1, as detailed above. Further, mass activity parameter estimation module 304 may also contain a weighted average scheme to determine the mass activity parameter as a measure of degradation according to some embodiments. The weighted average scheme may be selectively enabled or disabled based upon certain inputs.

Mass transfer coefficient estimation module 306 may receive inputs from stack voltage and current characteristics module 302, mass activity parameter estimation module 304, and from other sources 314. According to various embodiments, inputs 314 may include sensor inputs, constant values, values calculated by other modules not illustrated in FIG. 3, and the like. In some embodiments, inputs 314 may comprise inputs 310, inputs 312, and/or a subset of inputs 310 or inputs 312. Mass transfer coefficient estimation module 306 may perform calculations to generate an estimate of a mass transfer coefficient. According to certain embodiments, the mass transfer coefficient may also contain a weighted average scheme to determine the mass transfer coefficient as a measure of degradation. Mass transfer coefficient estimation module 306 based upon an input 314.

FC voltage estimation module 308 may receive inputs from mass transfer coefficient estimation module 306, stack voltage and current characteristics module 302 and from other sources. Inputs 316 may include sensor inputs, constant values, values calculated by modules not shown in FIG. 3, and the like. Inputs 316 may comprise inputs 310, inputs 312, inputs 314, and/or a subset of inputs 310, inputs 312, and/or inputs 314. According to various embodiments consistent with the present disclosure, the FC voltage estimation module 308 may calculate an estimate of a FC voltage. According to some embodiments, FC voltage estimation module 308 may generate a cell voltage raw estimate using Eq. 3

$$V_{est,raw}^{cell} = E_{rev} - \eta_{HOR} - \eta_{ORR}^{filtd} - i \cdot \left( \frac{R_{HFR} + R_{PT} + R_{MT}^{SS}}{1000} \right) + V_{transient} \quad \text{Eq. 3}$$

where, $E_{rev}$ is the thermodynamic reversible potential at reference conditions.

$\eta_{HOR}$ is the hydrogen oxidation reduction overpotential.

$\eta_{ORR}^{filtd}$ is the cathode oxidation reduction overpotential.

i is the stack current density.

$R_{HFR}$ is the stack HFR average.

$R_{PT}$ is the protonic resistance in electrode.

$R_{MT}^{SS}$ is the mass transfer coefficient.

$V_{transient}$ is the transient correction voltage factor.

The output of FC voltage estimation module 308 may be adjusted and refined over time, and accordingly, the estimate of the FC voltage generated by FC voltage estimation module 308 more accurately model the performance of a physical system whose parameters may provide one or more of inputs 310, 312, 314, and 316.

Figure 4:
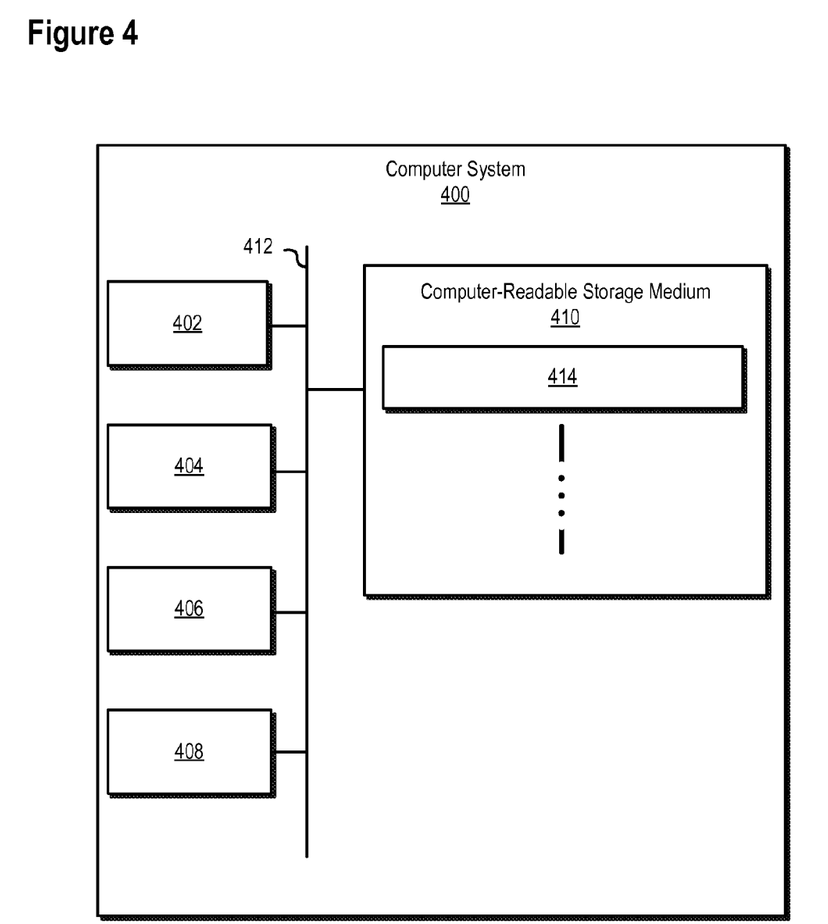
FIG. 4 illustrates a functional block diagram of an FC control computer system consistent with embodiments disclosed herein.

FIG. 4 illustrates a block diagram of a computer system 400 that may be utilized in implementing certain embodiments of the systems and methods disclosed herein. In certain embodiments, the computer system 400 may be a personal computer system, a server computer system, an on-board vehicle computer, an FC control system, and/or any other type of system suitable for implementing the disclosed systems and methods. In further embodiments, the computer system 400 may be any portable electronic computer system or electronic device including, for example, a notebook computer, a smartphone, and/or a tablet computer.

As illustrated, the computer system 400 may include, among other things, one or more processors 402, random access memory (RAM) 404, a communications interface 406, a user interface 408, and a non-transitory computer-readable storage medium 410. The processor 402, RAM 404, communications interface 406, user interface 408, and computer-readable storage medium 410 may be communicatively coupled to each other via a common data bus 412. In some embodiments, the various components of the computer system 400 may be implemented using hardware, software, firmware, and/or any combination thereof.

User interface 408 may include any number of devices allowing a user to interact with the computer system 400. For example, user interface 408 may be used to display an interactive interface to a user. The user interface 408 may be a separate interface system communicatively coupled with the computer system 400 or, alternatively, may be an integrated system such as a display interface for a laptop or other similar device. In certain embodiments, the user interface 408 may be produced on a touch screen display. The user interface 408 may also include any number of other input devices including, for example, keyboard, trackball, and/or pointer devices.

The communications interface 406 may be any interface capable of communicating with other computer systems, peripheral devices, and/or other equipment communicatively coupled to computer system 400. For example, the communications interface 406 may allow the computer system 400 to communicate with other computer systems (e.g., computer systems associated with external databases and/or the Internet), allowing for the transfer as well as reception of data from such systems. The communications interface 406 may include, among other things, a modem, a satellite data transmission system, an Ethernet card, and/or any other suitable device that enables the computer system 400 to connect to databases and networks, such as LANs, MANs, WANs and the Internet.

Processor 402 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 402 may be configured to execute computer-readable instructions stored on non-transitory computer-readable storage medium 410. Computer-readable storage medium 410 may store other data or information as desired. In some embodiments, the computer-readable instructions may include computer executable functional modules 414. For example, the computer-readable instructions may include one or more functional modules configured to implement all or part of the functionality of the systems and methods described above. Specific functional models that may be stored on computer-readable storage medium 410 include a stack voltage and current characteristics module, a mass activity parameter estimation module, a mass transfer coefficient estimation module, a cell voltage estimation module, a battery control module, and a voltage suppression module.

The system and methods described herein may be implemented independent of the programming language used to create the computer-readable instructions and/or any operating system operating on the computer system 400. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 400 may be in response to user commands, results of previous processing, or a request made by another processing machine. It will be appreciated that computer system 400 may utilize any suitable operating system including, for example, Unix, DOS, Android, Symbian, Windows, iOS, OSX, Linux, and/or the like.

The invention claimed is:

1. A system to predict a performance metric of a fuel cell (FC) stack, the system comprising:
a plurality of sensors in communication with the FC stack;
a performance metric prediction system configured to:
determine a current density based on an input from at least one of the plurality sensors at a plurality of time periods;
calculate a first parameter during a first time period in which the current density is below a lower threshold;
calculate a second parameter during a second time period in which the current density is above an upper threshold;
selectively adjust a FC polarization curve over time based upon the first parameter and the second parameter;
predict a performance metric of the FC stack based upon the FC polarization curve; and
a control system configured to implement a control action based upon the performance metric.

2. The system of claim 1, wherein the performance metric prediction system is further configured to:

measure a transient parameter based on at least one input from the plurality of sensors; and
further selectively adjusting the fuel cell polarization curve based upon the transient parameter.

3. The system of claim 2, wherein the transient parameter is based on a platinum oxide model.

4. The system of claim 1, wherein the performance metric comprises a cell voltage raw estimate calculated as:

$$V_{est,raw}^{cell} = E_{rev} - \eta_{HOR} - \eta_{ORR}^{filtd} - i \cdot \left( \frac{R_{HFR} + R_{PT} + R_{MT}^{SS}}{1000} \right) + V_{transient}$$

where,
$E_{rev}$ is the thermodynamic reversible potential at reference conditions,
$\eta_{HOR}$ is the hydrogen oxidation reduction overpotential,
$\eta_{ORR}^{filtd}$ is the cathode oxidation reduction overpotential,
i is the stack current density,
$R_{HFR}$ is the stack high frequency resistance HFR average,
$R_{PT}$ is the protonic resistance in electrode,
$R_{MT}^{SS}$ is the mass transfer coefficient,
$V_{transient}$ is the transient correction voltage factor.

5. The system of claim 1, wherein the performance metric comprises a maximum power estimate.

6. The system of claim 1, wherein the control action comprises scheduling a power request based on the performance metric.

7. The system of claim 1, further comprising:
a voltage suppression system; and
wherein the control action comprises establishing a voltage suppression set point based upon the performance metric.

8. The system of claim 1, wherein at least one of the plurality of sensors is configured to measure a coolant temperature, and the performance metric prediction system is configured to selectively discard current density measurements during time periods in which the coolant temperature is below the coolant temperature threshold.

9. The system of claim 1, further comprising:
a fault detection system in communication with the plurality of electrical sensors and configured to detect a fault condition based upon input from one or more of the plurality of electrical sensors.

10. The system of claim 1, wherein the first parameter comprises a mass activity parameter calculated based on a voltage measurement associated with at least one of the plurality of sensors.

11. The system of claim 10, wherein the mass activity parameter is calculated as:

$$\eta_{ORR} = E_{rev} - \eta_{HOR} - V_{cell} - i \cdot \left( \frac{R_{HFR} + R_{PT} + R_{MT}^{SS}}{1000} \right) + V_{transient}$$

where,
$E_{rev}$ is the thermodynamic reversible potential at reference conditions,
$\eta_{HOR}$ is the hydrogen oxidation reduction overpotential,
$V_{cell}$ is the average cell voltage feedback,
i is the stack current density,
$R_{HFR}$ is the stack high frequency resistance HFR average,
$R_{PT}$ is the protonic resistance in electrode,
$R_{MT}^{SS}$ is the mass transfer coefficient,
$V_{transient}$ is the transient correction voltage factor.

12. The system of claim 1, wherein the second parameter comprises a mass transfer coefficient calculated based on a voltage measurement associated with at least one of the plurality of sensors.

13. The system of claim 12, wherein the mass transfer coefficient is calculated as $$R_{MT}^{Raw} = (E_{rev} - V_{cell} - \eta_{HOR} - \eta_{ORR}^{filtd} + V_{transient}) \cdot \frac{1000}{i} - (R_{HFR} + R_{PT})$$

where,
$E_{rev}$ is the thermodynamic reversible potential at reference conditions,
$V_{cell}$ is the average cell voltage feedback,
$\eta_{ORR}^{filtd}$ is the hydrogen oxidation reduction overpotential,
$\eta_{HOR}$ is the cathode oxidation reduction overpotential,
i is the stack current density,
$R_{HFR}$ is the stack high frequency resistance HFR average,
$R_{PT}$ is the protonic resistance in electrode,
$R_{MT}^{Raw}$ is the mass transfer coefficient,
$V_{transient}$ is the transient correction voltage factor.

14. A method for predicting a performance metric of a fuel cell (FC) stack, the method comprising:
receiving a plurality of inputs from a plurality of sensors;
determining a current density based on at least one of the plurality of inputs at a plurality of time periods;
calculating a first parameter during a first time period in which the current density is below a lower threshold;
calculating a second parameter during a second time period in which the current density is above an upper threshold;
selectively adjusting a fuel cell polarization curve over time based upon the first parameter and the second parameter;
predicting a performance metric of the fuel cell stack based upon the fuel cell polarization curve; and
implementing a control action based upon the performance metric.

15. The method of claim 14, further comprising:
measuring a transient parameter based on at least one of the plurality of inputs from the plurality of sensors; and
wherein selectively adjusting the fuel cell polarization curve is further based upon the transient parameter.

16. The method of claim 15, wherein the transient parameter is based on a platinum oxide model.

17. The method of claim 14, wherein the performance metric comprises a maximum power estimate.

18. The method of claim 14, wherein the control action comprises scheduling a power request based on the performance metric.

19. The method of claim 14, wherein implementing the control action based upon the performance metric comprises establishing a voltage suppression set point; and the method further comprises:
configuring a voltage suppression system to suppress a voltage below the voltage suppression set point.

20. The method of claim 14, further comprising:
measuring a coolant temperature using at least one of the plurality of sensors;
comparing the coolant temperature to a coolant temperature threshold;
selectively discarding current density measurements during time periods in which the coolant temperature is below the coolant temperature threshold.

* * * * *